United States Patent
Wang et al.

(10) Patent No.: US 8,312,241 B2
(45) Date of Patent: Nov. 13, 2012

(54) SERIAL BUFFER TO SUPPORT REQUEST PACKETS WITH OUT OF ORDER RESPONSE PACKETS

(75) Inventors: Chi-Lie Wang, Milpitas, CA (US); Jason Z. Mo, Fremont, CA (US)

(73) Assignee: Integrated Device Technology, inc., San Jose, CA (US)

( * ) Notice: Subject to any disclaimer, the term of this patent is extended or adjusted under 35 U.S.C. 154(b) by 405 days.

(21) Appl. No.: 12/043,943

(22) Filed: Mar. 6, 2008

(65) Prior Publication Data

US 2009/0228630 A1    Sep. 10, 2009

(51) Int. Cl.
G06F 12/12    (2006.01)

(52) U.S. Cl. .................. 711/170; 711/E12.072; 710/56; 714/749

(58) Field of Classification Search .................. None
See application file for complete search history.

(56) References Cited

U.S. PATENT DOCUMENTS

| | | |
|---|---|---|
| 4,214,305 A | 7/1980 | Tokita |
| 4,335,277 A | 6/1982 | Puri |
| 4,782,485 A | 11/1988 | Gollub |
| 4,866,704 A | 9/1989 | Bergman |
| 5,018,136 A | 5/1991 | Gollub |
| 5,107,489 A | 4/1992 | Brown et al. |
| 5,245,704 A * | 9/1993 | Weber et al. .................. 709/215 |
| 5,257,384 A | 10/1993 | Farrand et al. |
| 5,313,454 A | 5/1994 | Bustini et al. |
| 5,426,643 A | 6/1995 | Smolinske et al. |
| 5,530,902 A | 6/1996 | McRoberts et al. |
| 5,572,697 A | 11/1996 | Chevalier et al. |
| 5,655,140 A | 8/1997 | Haddock |
| 5,717,883 A | 2/1998 | Sager |
| 5,777,547 A | 7/1998 | Waldrop |
| 5,916,309 A | 6/1999 | Brown et al. |
| 5,924,112 A * | 7/1999 | Barber et al. .................. 711/100 |
| 5,951,706 A * | 9/1999 | Benner ........................ 714/749 |
| 5,983,301 A | 11/1999 | Baker et al. |
| 6,046,817 A | 4/2000 | Brown et al. |
| 6,047,319 A | 4/2000 | Olson |
| 6,061,089 A | 5/2000 | Tonkin et al. |
| 6,084,631 A | 7/2000 | Tonkin et al. |

(Continued)

OTHER PUBLICATIONS

Mercury Computer Systems, Inc. article entitled: "Serial Rapid IO-to-PCIe Bridge IP Core Available for Both ASICs and FPGAs . . . " dated Oct. 30, 2006; 2 pages.

(Continued)

*Primary Examiner* — Charles Rones
*Assistant Examiner* — Nathan N Sadler
(74) *Attorney, Agent, or Firm* — Bever, Hoffman & Harms (57) ABSTRACT

Within a serial buffer, request packets are written to available memory blocks of a memory buffer, which are identified by a free buffer pointer list. When a request packet is written to a memory block, the memory block is removed from the free buffer pointer list, and added to a used buffer pointer list. Memory blocks in the used buffer pointer list are read, thereby transmitting the associated request packets from the serial buffer. When a request packet is read from a memory block, the memory block is removed from the used buffer pointer list and added to a request buffer pointer list. If a corresponding response packet is received within a timeout period, the memory block is transferred from the request buffer pointer list to the free buffer pointer list. Otherwise, the memory block is transferred from the request buffer pointer list to the used buffer pointer list.

20 Claims, 6 Drawing Sheets

U.S. PATENT DOCUMENTS

| | | | |
|---|---|---|---|
| 6,157,621 A | 12/2000 | Brown et al. | |
| 6,233,629 B1 | 5/2001 | Castellano | |
| 6,271,866 B1 | 8/2001 | Hancock et al. | |
| 6,333,938 B1 | 12/2001 | Baker | |
| 6,347,344 B1 | 2/2002 | Baker et al. | |
| 6,425,021 B1 | 7/2002 | Ghodrat et al. | |
| 6,442,687 B1 | 8/2002 | Savage | |
| 6,510,138 B1 | 1/2003 | Pannell | |
| 6,546,496 B1 | 4/2003 | Wang et al. | |
| 6,564,271 B2 * | 5/2003 | Micalizzi et al. | 710/39 |
| 6,581,175 B1 * | 6/2003 | Crump et al. | 714/748 |
| 6,631,429 B2 * | 10/2003 | Cota-Robles et al. | 710/52 |
| 6,636,483 B1 | 10/2003 | Pannell | |
| 6,658,477 B1 | 12/2003 | Lisitsa et al. | |
| 6,748,020 B1 | 6/2004 | Eifrig et al. | |
| 6,862,298 B1 | 3/2005 | Smith et al. | |
| 6,907,479 B2 | 6/2005 | Karnstedt et al. | |
| 6,944,186 B2 | 9/2005 | Zaun et al. | |
| 6,985,969 B1 | 1/2006 | Cheng | |
| 6,993,602 B2 | 1/2006 | Merrill et al. | |
| 7,013,354 B1 | 3/2006 | Beck et al. | |
| 7,088,735 B1 | 8/2006 | Reohr, Jr. et al. | |
| 7,212,962 B2 | 5/2007 | Masushige et al. | |
| 7,213,094 B2 | 5/2007 | Edirisooriya et al. | |
| 7,436,858 B2 | 10/2008 | Goren et al. | |
| 7,594,002 B1 | 9/2009 | Thorpe et al. | |
| 7,617,346 B2 | 11/2009 | Wang et al. | |
| 7,631,128 B1 | 12/2009 | Sgrosso et al. | |
| 7,680,944 B1 | 3/2010 | Taghizadeh et al. | |
| 7,707,335 B2 * | 4/2010 | Lidji et al. | 710/52 |
| 7,710,969 B2 | 5/2010 | Szczepanek et al. | |
| 7,764,608 B2 | 7/2010 | Breynaert et al. | |
| 2001/0054116 A1 | 12/2001 | Cheng | |
| 2002/0080791 A1 | 6/2002 | Sylvain | |
| 2002/0171741 A1 | 11/2002 | Tonkin et al. | |
| 2002/0181481 A1 | 12/2002 | Iny | |
| 2004/0103333 A1 | 5/2004 | Martwick et al. | |
| 2004/0225779 A1 | 11/2004 | Zhao et al. | |
| 2004/0240478 A1 | 12/2004 | Goren et al. | |
| 2005/0100049 A1 | 5/2005 | Siminoff | |
| 2005/0100114 A1 | 5/2005 | Satagopan et al. | |
| 2005/0105556 A1 | 5/2005 | Joung et al. | |
| 2005/0135390 A1 | 6/2005 | Anderson et al. | |
| 2005/0144341 A1 | 6/2005 | Schmidt et al. | |
| 2005/0246424 A1 | 11/2005 | Panec et al. | |
| 2005/0254518 A1 | 11/2005 | Fujimori | |
| 2005/0283598 A1 | 12/2005 | Gaskins et al. | |
| 2006/0018329 A1 | 1/2006 | Nielsen et al. | |
| 2006/0056435 A1 | 3/2006 | Biran et al. | |
| 2006/0153238 A1 | 7/2006 | Bar-On et al. | |
| 2006/0224812 A1 * | 10/2006 | Kapoor et al. | 710/310 |
| 2006/0251088 A1 | 11/2006 | Thubert et al. | |
| 2007/0050564 A1 * | 3/2007 | Gunna et al. | 711/146 |
| 2007/0110046 A1 | 5/2007 | Farrell et al. | |
| 2007/0130410 A1 * | 6/2007 | Keller et al. | 710/310 |
| 2007/0230403 A1 | 10/2007 | Douglas et al. | |
| 2008/0008211 A1 | 1/2008 | Zilbershtein et al. | |
| 2008/0082840 A1 | 4/2008 | Kendall et al. | |
| 2008/0096433 A1 | 4/2008 | Bixler et al. | |
| 2008/0205422 A1 | 8/2008 | Wang et al. | |
| 2008/0205438 A1 | 8/2008 | Juan et al. | |
| 2008/0209084 A1 | 8/2008 | Wang et al. | |
| 2008/0209089 A1 | 8/2008 | Mo et al. | |
| 2008/0301327 A1 * | 12/2008 | Archer et al. | 710/22 |
| 2009/0052323 A1 | 2/2009 | Breynaert et al. | |
| 2009/0086751 A1 | 4/2009 | Wang | |
| 2009/0181663 A1 | 7/2009 | Hu et al. | |
| 2009/0225770 A1 | 9/2009 | Wang et al. | |
| 2009/0292935 A1 | 11/2009 | Hallnor et al. | |
| 2010/0111526 A1 | 5/2010 | Bader | |

OTHER PUBLICATIONS

RapidIO Interconnect Specification, Part VI: Physical Layer lx/4x LP Serial Specification, Rev. 1.2, Jun. 2002.

* cited by examiner

SERIAL BUFFER TO SUPPORT REQUEST PACKETS WITH OUT OF ORDER RESPONSE PACKETS

RELATED APPLICATIONS

The present application is related to, and incorporates by reference, the following commonly owned, co-filed U.S. patent applications Ser. No. 12/043,918 filed by Chi-Lie Wang and Jason Z. Mo on Mar. 6, 2008, entitled "Method To Support Flexible Data Transport On Serial Protocols"; Ser. No. 12/043,929 also filed by Chi-Lie Wang and Jason Z. Mo on Mar. 6, 2008, entitled "Protocol Translation In A Serial Buffer"; Ser. No. 12/043,934 filed by Chi-Lie Wang and Jason Z. Mo on Mar. 6, 2008, entitled "Serial Buffer To Support Reliable Connection Between Rapid I/O End-Point And FPGA Lite-Weight Protocols"; Ser. No. 12/043,940 filed by Chi-Lie Wang on Mar. 6, 2008, entitled "Power Management On sRIO Endpoint"; and Ser. No. 12/043,944 filed by Chi-Lie Wang, Jason Z. Mo, Calvin Nguyen and Bertan Tezcan on Mar. 6, 2008, entitled "Method To Support Lossless Real Time Data Sampling And Processing On Rapid I/O End-Point".

FIELD OF THE INVENTION

The present invention relates to a serial buffer designed to enable out of order responses and data re-transmission in a system that implements a serial rapid I/O (sRIO) protocol.

RELATED ART

A conventional serial buffer is capable of generating a series of request packets which are transmitted to an sRIO end-point. In response, the sRIO endpoint returns a corresponding series of response packets to the serial buffer. However, a conventional serial buffer is only capable of processing the response packets in the same order that the corresponding request packets were sent. Thus, if a conventional serial buffer sequentially transmits first, second and third request packets to an sRIO end-point, the serial buffer is configured to sequentially process first, second and third response packets (which represent responses to the first, second and third request packets, respectively). If the second and/or third response packet is received by the serial buffer before the first response packet, the conventional serial buffer cannot process the second and/or third response packet until after the first response packet is received by the serial buffer. This is condition, which is referred to as a head of line blocking, can result in slow processing in the serial buffer.

It would therefore be desirable to have a serial buffer capable of efficiently and flexibly processing request packets and response packets.

SUMMARY

Accordingly, the present invention provides a serial buffer configured to implement the sRIO protocol. The serial buffer includes logic to support split request/response transactions with out of order response. That is, the serial buffer enables response packets to be received and processed in a different order than the corresponding request packets are transmitted from the serial buffer. To support out of order responses, a buffer memory stores a copy of each request packet transmitted from the serial buffer. More specifically the buffer memory includes a plurality of memory blocks, each capable of storing a copy of a corresponding request packet. Each memory block holds the corresponding request packet until the corresponding response packet is returned to the serial buffer. Only then is the memory block made available to store a new request packet. Correspondence between the response packets and the request packets is established by assigning a unique transaction identifier (ID) value to each response packet and its corresponding request packet.

For each request packet issued, a corresponding request timeout counter is loaded with a programmed value, and enabled to start counting down. If a request timeout counter reaches zero before the corresponding response packet is returned, the serial buffer re-sends the original request packet from the buffer memory to guarantee packet delivery.

The present invention will be more fully understood in view of the following description and drawings.

DETAILED DESCRIPTION

In general, the present invention provides a serial buffer that transmits sRIO logic layer request packets to an sRIO endpoint, and allows the corresponding sRIO logic layer response packets to be received out of order. Note that response packets may be received out of order, for example, due to system topology or due to request packets being issued out of order. Thus, a subsequent request packet can be issued prior to a response packet being returned for an earlier issued request packet. As a result, head of line blocking conditions are eliminated.

A free buffer pointer list is used to allocate free memory blocks in a buffer memory, which is used to store SRIO logic layer request packets. Each memory block can store up to 256 bytes (which corresponds with the maximum length of an sRIO request packet). Note that each memory block does not need to include contiguous address locations within the buffer memory. That is, a request packet does not need to be stored in contiguous memory locations of the buffer memory.

Each free buffer pointer addresses a 256 byte memory block within the buffer memory. When a request packet is written to a memory block identified by a free buffer pointer, the free buffer pointer is removed from the free buffer pointer list, and is added to a used buffer pointer list (as a used buffer pointer). This free buffer pointer (or used buffer pointer) can be used to represent the transaction ID value of the corresponding request packet written to the memory block.

If there is a used buffer pointer in the used buffer pointer list, request control logic is activated to transfer the associated request packet out of the memory block addressed by the used buffer pointer. After the request packet is transferred out of the memory block, the used buffer pointer is removed from the used buffer pointer list, and is added to a request buffer pointer list (as a request buffer pointer).

When a response packet is returned to the serial buffer, the transaction ID value of the response packet is compared with the request buffer pointers in the request buffer pointer list. If a match is found, the matching request buffer pointer is removed from the request buffer pointer list, and is added to the free buffer pointer list, thereby effectively releasing the associated memory block to store a new request packet.

Each time a request packet is transmitted from the serial buffer, a corresponding response timeout timer is started. The transaction ID value of the request packet is used to establish the correspondence with the response timeout timer. If an associated response packet is not returned prior to expiration of the response timeout timer, a transit error is assumed to exist, and the request packet is resent. To re-send the request packet, the associated request buffer pointer is removed from the request buffer pointer list, and is added to the used buffer pointer list (as a used buffer pointer).

In this manner, the serial buffer of the present invention is able to support out of order response packets with request packet retransmission capability. The serial buffer of the present invention will now be described in more detail.

Figure 1:
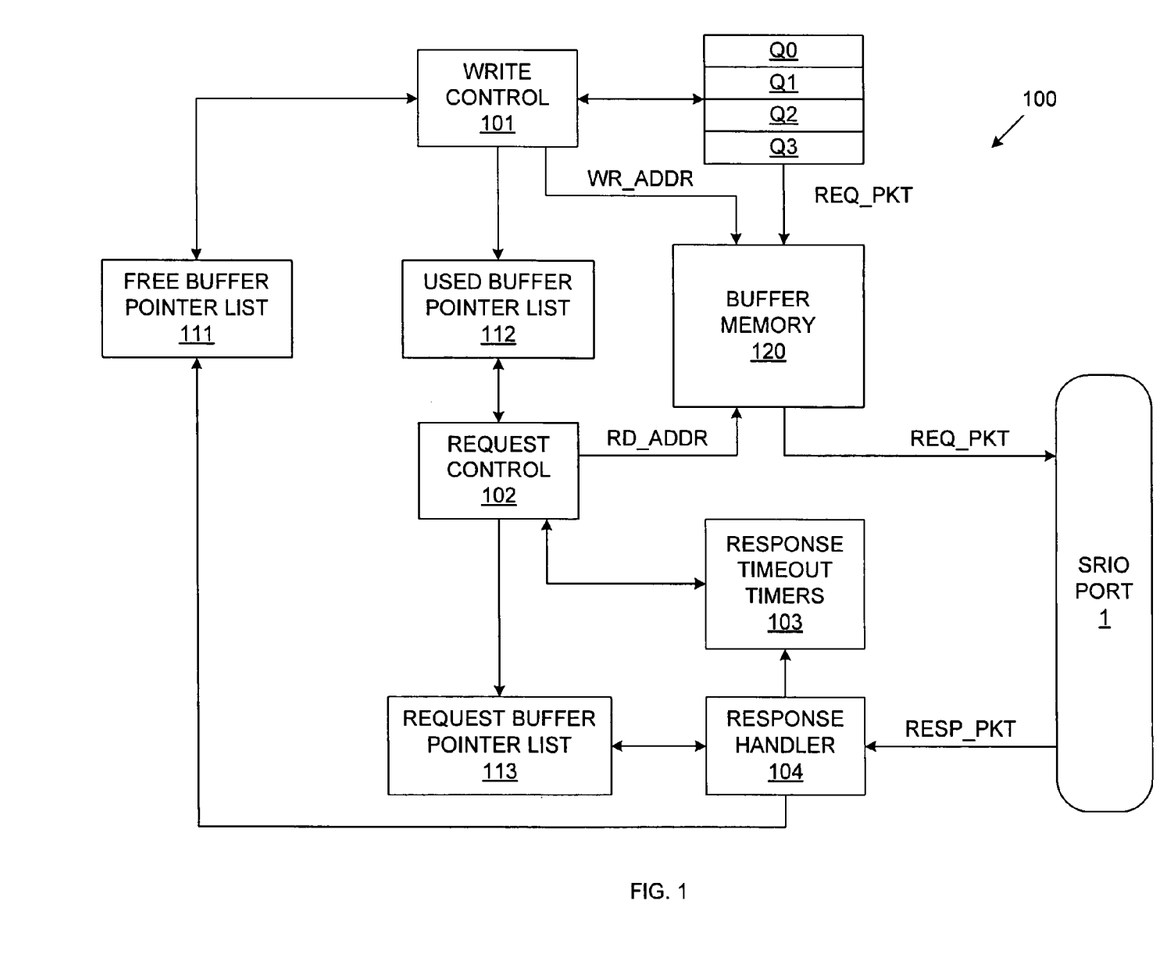
FIG. 1 is a block diagram of a portion of a serial buffer in accordance with one embodiment of the present invention.

FIG. 1 is a block diagram of a portion of a serial buffer 100 in accordance with one embodiment of the present invention. Serial buffer 100 includes first port 1, memory queues Q0-Q3, write control logic 101, request control logic 102, response timeout timers 103, response handler logic 104, free buffer pointer list 111, used buffer pointer list 112, request buffer pointer list 113 and buffer memory 120.

In the described embodiments, first port 1 of serial buffer 100 is configured to operate in accordance with an sRIO protocol, and provides an interface to an external sRIO endpoint (not shown). Queues Q0-Q3 are configured to store sRIO request packets to be transmitted through the first port 1 to the external sRIO endpoint. As described in more detail below, each of these sRIO request packets (REQ_PKT) is assigned a transaction identification (ID) value. Upon receiving and processing the sRIO request packet, the external sRIO endpoint returns an sRIO response packet (RESP_PKT) that includes the same transaction ID value to sRIO port 1. The response packet enables the serial buffer 100 to confirm that the request packet was in fact received and processed by the sRIO endpoint.

Queues Q0-Q3 are operated in a FIFO (first in, first out) manner, such that the first request packet written into a queue will be the first request packet read out from the queue. However, the request packets read from queues Q0-Q3 may not arrive at their final destinations in the same order that these request packets are read out of queues Q0-Q3, due to system topology and packet priority. As a result, the response packets returned to sRIO port 1 may not be received in the same order that the corresponding request packets were read out of the queues Q0-Q3. However, as described in more detail below, serial buffer 100 operates to prevent head of line blocking on queues Q0-Q3 if the response packets are not returned in the same order that the corresponding request packets are read from queues Q0-Q3.

Figure 2:
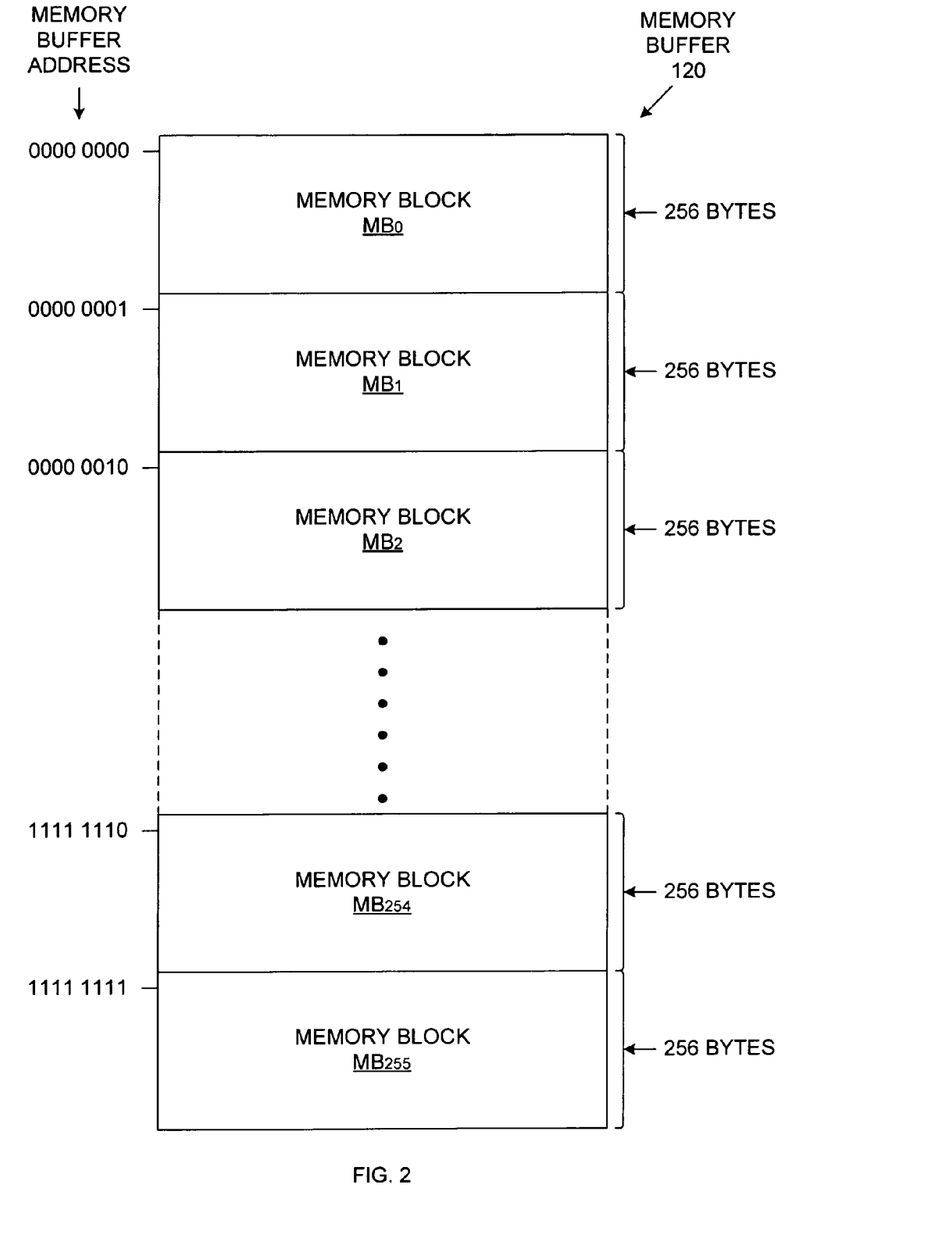
FIG. 2 is a block diagram of a buffer memory used to store request packets in the serial buffer of FIG. 1 in accordance with one embodiment of the present invention.

FIG. 2 is a block diagram of buffer memory 120 in accordance with the described embodiments of the present invention. Buffer memory 120 includes 256 individually addressable memory blocks $MB_0$-$MB_{255}$, each capable of storing a sRIO request packet. In other embodiments, buffer memory 120 can include other numbers of memory blocks. In the described examples, each of memory blocks $MB_0$-$MB_{255}$ has a capacity of 256 bytes, which is the maximum request packet size defined by the sRIO specification. Each memory block $MB_N$ (wherein N=0 to 255, inclusive) is accessed (for read and write operations) in response to a corresponding memory buffer address (pointer) value, which in the described embodiments, is the binary representation of the integer, N (wherein N=0 to 255, inclusive). For example, memory block $MB_3$ is accessed in response to a memory buffer address of '0000 0011'.

Figure 3A:
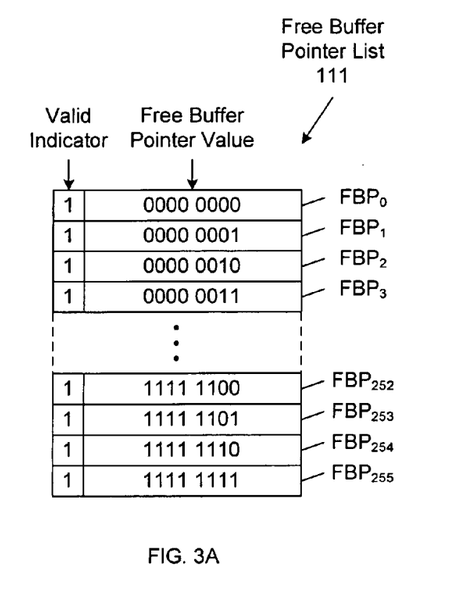
FIG. 3A is a block diagram of a free buffer pointer list used to identify available blocks of the buffer memory of FIG. 2 in accordance with one embodiment of the present invention.

FIG. 3A is a block diagram of free buffer pointer list 111 in accordance with one embodiment of the present invention. In this embodiment, free buffer pointer list 111 includes 256 free buffer pointer entries $FBP_0$-$FBP_{255}$, each including a valid indicator bit and a unique 8-bit free buffer address (pointer) value. Each of the free buffer pointer entries $FBP_0$-$FBP_{255}$ is associated with a corresponding one of the memory blocks $MB_0$-$MB_{255}$ in buffer memory 120. More specifically, the free buffer address values stored by free buffer pointer entries $FBP_0$-$FBP_{255}$ correspond with the memory buffer address values associated with memory blocks $MB_0$-$MB_{255}$, respectively. In general, an activated (logic '1') valid indicator bit in free buffer pointer list 111 indicates that the corresponding memory block is available (free) to store a request packet. Conversely, a deactivated (logic '0') valid indicator bit in free buffer pointer list 111 indicates that the corresponding memory block currently stores a request packet. FIG. 3A illustrates the state of free buffer pointer list 111 immediately after serial buffer 100 is reset, wherein all of the valid indicator bits of free buffer pointer list 111 are activated, thereby indicating that all of the associated memory blocks $MB_0$-$MB_{255}$ are initially free. Note that activating the valid indicator bit of a free buffer pointer entry may be viewed as 'adding' the corresponding memory block to free buffer pointer list 111. Conversely, deactivating the valid indicator bit of a free buffer pointer entry may be viewed as 'removing' the corresponding memory block from free buffer pointer list 111.

Figure 3B:
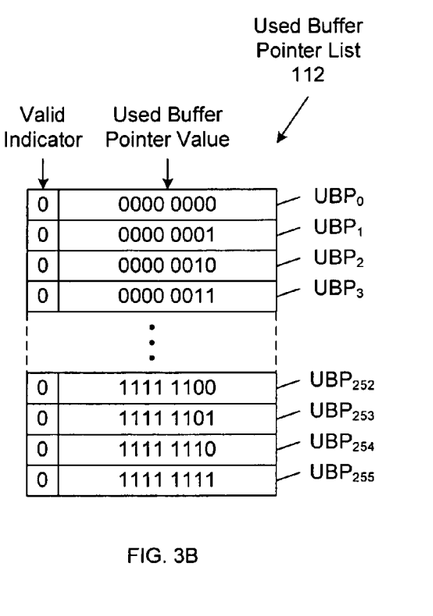
FIG. 3B is a block diagram of a used buffer pointer list used to identify blocks of the buffer memory of FIG. 2 that store request packets to be transmitted out of the serial buffer in accordance with one embodiment of the present invention.

FIG. 3B is a block diagram of used buffer pointer list 112 in accordance with one embodiment of the present invention. In this embodiment, used buffer pointer list 112 includes 256 used buffer pointer entries $UBP_0$-$UBP_{255}$, each including a valid indicator bit and a unique 8-bit used buffer address (pointer) value. Each of the used buffer pointer entries $UBP_0$-$UBP_{255}$ is associated with a corresponding one of the memory blocks $MB_0$-$MB_{255}$ in buffer memory 120. More specifically, the used buffer address values stored by used buffer pointer entries $UBP_0$-$UBP_{255}$ correspond with the memory buffer address values associated with memory blocks $MB_0$-$MB_{255}$, respectively. In general, an activated (logic '1') valid indicator bit in used buffer pointer list 112 indicates that the corresponding memory block currently stores a request packet that must be transmitted to sRIO port 1. Conversely, a deactivated (logic '0') valid indicator bit in used buffer pointer list 112 indicates that the corresponding memory block does not currently store a request packet that must be transmitted to sRIO port 1. FIG. 3B illustrates the state of used buffer pointer list 112 immediately after serial buffer 100 is reset, wherein all of the valid indicator bits of used buffer pointer list 112 are deactivated, thereby indicating that none of the memory blocks $MB_0$-$MB_{255}$ stores a request packet that must be transmitted to sRIO port 1 at this time.

Note that activating the valid indicator bit of a used buffer pointer entry may be viewed as 'adding' the corresponding memory block to used buffer pointer list 112. Conversely, deactivating the valid indicator bit of a used buffer pointer entry may be viewed as 'removing' the corresponding memory block from used buffer pointer list 112.

Figure 3C:
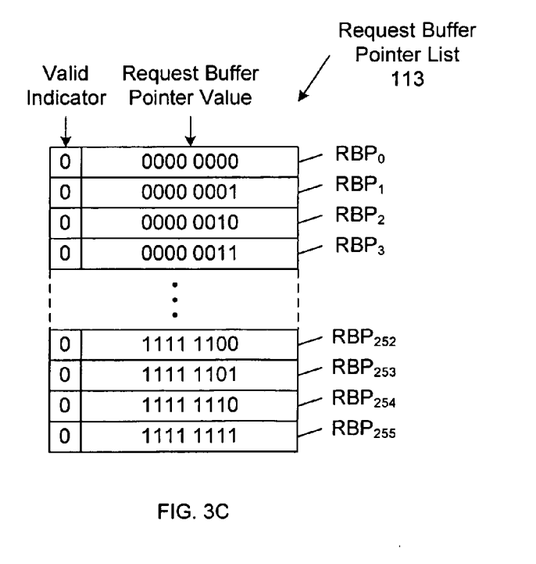
FIG. 3C is a block diagram of a request buffer pointer list used to identify blocks of the buffer memory of FIG. 2 that store request packets that have already been transmitted out of the serial buffer, and are awaiting responses, in accordance with one embodiment of the present invention.

FIG. 3C is a block diagram of request buffer pointer list 113 in accordance with one embodiment of the present invention. In this embodiment, request buffer pointer list 113 includes 256 request buffer pointer entries $RBP_0$-$RBP_{255}$, each including a valid indicator bit and a unique 8-bit request buffer address (pointer) value. Each of the request buffer pointer entries $RBP_0$-$RBP_{255}$ is associated with a corresponding one of the memory blocks $MB_0$-$MB_{255}$ in buffer memory 120. More specifically, the request buffer address values stored by request buffer pointer entries $RBP_0$-$RBP_{255}$ correspond with the memory buffer address values associated with memory blocks $MB_0$-$MB_{255}$, respectively. In general, an activated (logic '1') valid indicator bit in request buffer pointer list 113 indicates that a request packet has been transmitted from the corresponding memory block to sRIO port 1, and a corresponding response packet is expected to be received on sRIO port 1. Conversely, a deactivated (logic '0') valid indicator bit in request buffer pointer list 113 indicates that a request packet has not been transmitted from the corresponding memory block to sRIO port 1, and that a corresponding response packet is not expected. FIG. 3C illustrates the state of request buffer pointer list 113 immediately after serial buffer 100 is reset, wherein all of the valid indicator bits of request buffer pointer list 113 are deactivated, thereby indicating that no response packets are expected in response to previously transmitted request packets.

Note that activating the valid indicator bit of a request buffer pointer entry may be viewed as 'adding' the corresponding memory block to request buffer pointer list 113. Conversely, deactivating the valid indicator bit of a request buffer pointer entry may be viewed as 'removing' the corresponding memory block from request buffer pointer list 113.

Figure 4:
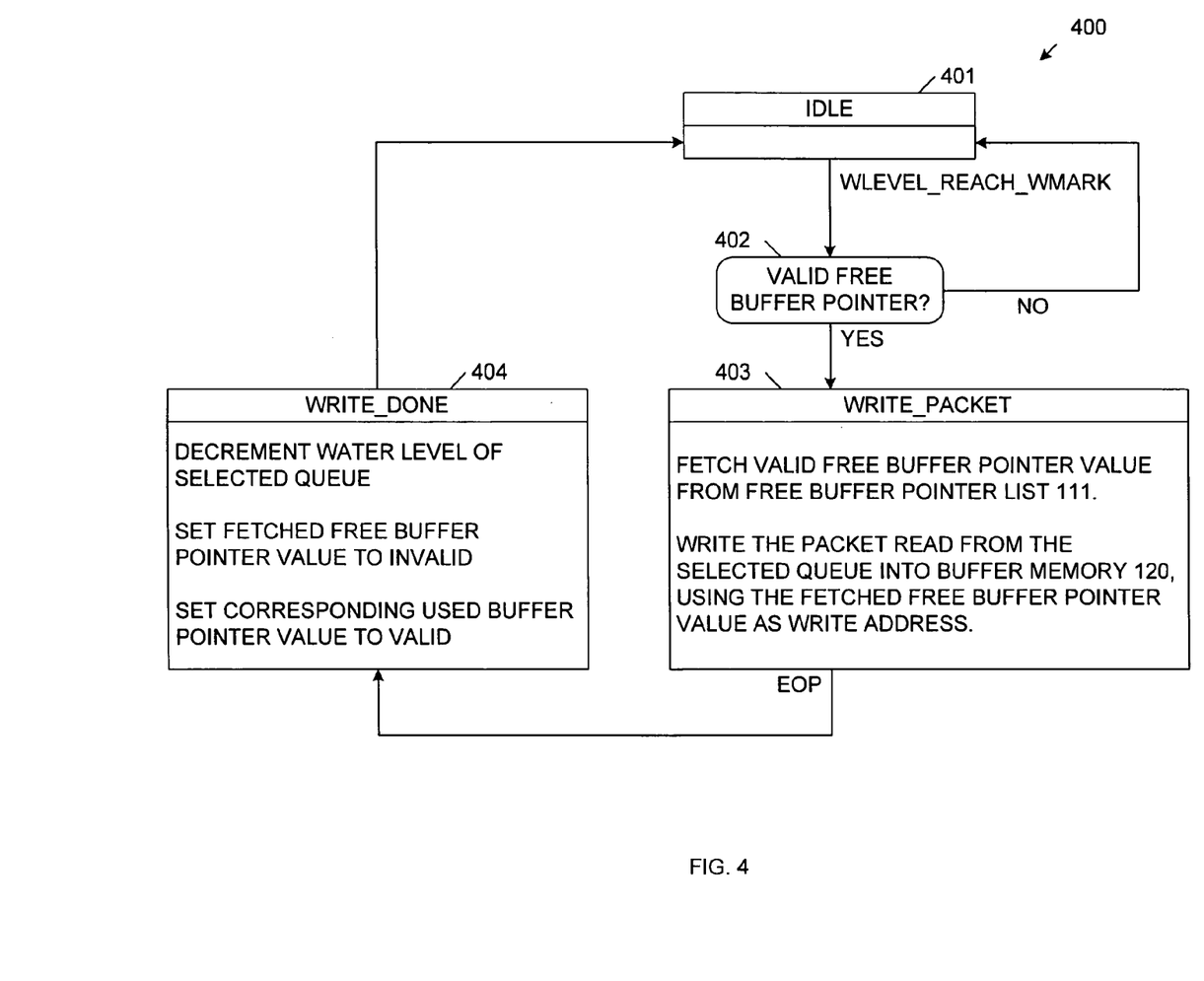
FIG. 4 is a flow diagram illustrating the operation of write control logic present in the serial buffer of FIG. 1 in accordance with one embodiment of the present invention.

FIG. 4 is a flow diagram 400 illustrating the operation of write control logic 101 in accordance with one embodiment of the present invention. Write control logic 101 is initially in an IDLE state 401. SRIO request packets are written to queues Q0-Q3 during normal operation of serial buffer 100. Each time that a sRIO request packet is written to a queue, a water level associated with the queue is incremented by one. If the water level of a queue reaches a water mark of the queue (WLEVEL_REACH_WMARK=1), then a sRIO request packet is read from the queue and provided to buffer memory 120. Queues Q0-Q3 are operated in a first in, first out manner in the described embodiment. If more than one queue has a water level that reaches its corresponding water mark, then the sRIO request packet is read from the highest priority queue.

After a sRIO packet has been read from the selected queue, processing continues to Step 402, wherein write control logic 101 determines whether any of the free buffer pointer entries $FBP_0$-$FBP_{255}$ in free buffer pointer list 111 is valid (i.e., includes an activated valid bit). As described above in connection with FIG. 3A, all of the free buffer pointer entries $FBP_0$-$FBP_{255}$ are initially valid. Upon detecting at least one valid free buffer pointer entry (Step 402, YES branch), processing proceeds to WRITE_PACKET state 403.

Note that if none of the free buffer pointer entries $FBP_0$-$FBP_{225}$ is valid (Step 402, NO branch), processing returns to the IDLE state 401, as there is no capacity remaining in buffer memory 120 to store the sRIO request packet read from the selected queue.

Within WRITE_PACKET state 403, write control logic 101 retrieves the next valid free buffer pointer value from free buffer pointer list 111. In the described embodiment, free buffer pointer list 111 is operated as a circular buffer, wherein free buffer pointer entry $FBP_0$ is initially accessed, followed sequentially by free buffer pointer entries $FBP_1$-$FBP_{255}$. During the first cycle through free buffer pointer list 111, all of the free buffer pointer entries $FBP_0$-$FBP_{255}$ will be valid. However, during subsequent cycles through free buffer pointer list 111, some of the free buffer pointer entries $FBP_0$-$FBP_{255}$ may be invalid (indicating that the corresponding memory blocks currently store active request packets). During these subsequent cycles through free buffer pointer list 111, write control logic 101 ignores (skips) these invalid free buffer pointer entries, effectively 'removing' these invalid free pointer entries (and the associated memory blocks) from free buffer pointer list 111.

Write control logic 101 uses the retrieved valid free buffer pointer value as a write address to access the corresponding memory block in buffer memory 120. Write control logic then causes the sRIO request packet read from the selected queue to be written to this memory block in buffer memory 120. For example, write control logic 101 initially retrieves the free buffer pointer value of '0000 0000' from the first valid free buffer pointer entry $FBP_0$, and uses this free buffer pointer value to address the first memory block $MB_0$ of buffer memory 120. Write control logic 101 then causes the first sRIO request packet read from queues Q0-Q3 to be written to this addressed memory block $MB_0$.

Write control logic 101 monitors the sRIO request packet being written to buffer memory 120 to determine when an end-of-packet (EOP) indicator associated with the sRIO request packet has been activated (EOP=1). Upon detecting the activated end-of-packet indicator, write control logic 101 completes the writing of the sRIO request packet to the associated memory block, and processing proceeds to WRITE_DONE state 404.

Within WRITE_DONE state 404, write control logic 101 causes the water level of the selected queue to be decremented by one, to reflect the fact that a sRIO request packet has been read out of the selected queue (and stored in buffer memory 120). In addition, write control logic 101 invalidates the free buffer pointer entry previously used to write the sRIO request packet to buffer memory 120 during WRITE_PACKET state 403. For example, in the present example, write control logic 101 resets the valid bit of free buffer pointer entry $FBP_0$ to a logic '0' (invalid) state. This prevents free buffer pointer entry $FBP_0$ (and thereby the corresponding memory block $MB_0$) from being reused until after this free buffer pointer entry $FBP_0$ is validated. The manner in which free buffer pointer entries are re-validated is described in more detail below.

Also within WRITE_DONE state 404, write control logic 101 validates the used buffer pointer entry associated with the memory block to which the sRIO request packet was written during WRITE_PACKET state 403. Thus, in the present example, write control logic 101 sets the valid bit of used buffer pointer entry $UBP_0$ to a logic '1' (valid) state. As described below, this valid used buffer pointer entry $UBP_0$ causes the sRIO request packet stored in the corresponding memory block $MB_0$ to be read out to sRIO port 1. Note that setting the valid bit of a used buffer pointer entry may be viewed as 'adding' the associated used buffer pointer value to used buffer pointer list 112. When the above-described steps of WRITE_DONE state 404 have been completed, processing returns to IDLE state 401.

Figure 5:
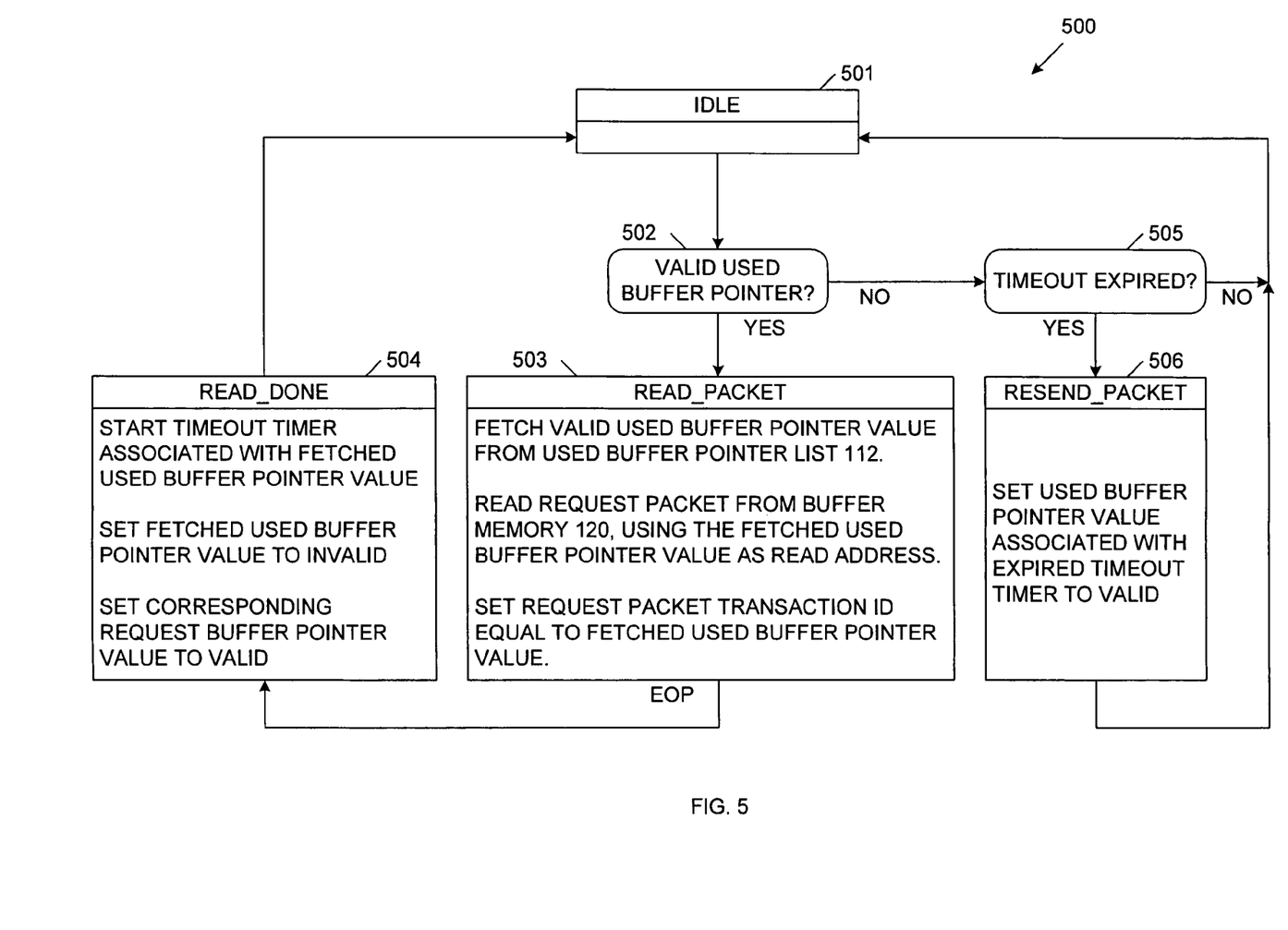
FIG. 5 is a flow diagram illustrating the operation of response control logic present in the serial buffer of FIG. 1 in accordance with one embodiment of the present invention.

FIG. 5 is a flow diagram 500 illustrating the operation of request control logic 102 in accordance with one embodiment of the present invention. Request control logic 102 is initially in an IDLE state 501. Request control logic 102 monitors used buffer pointer list 112 to determine whether any of the used buffer pointer entries $UBP_0$-$UBP_{255}$ in used buffer pointer list 112 is valid (i.e., includes an activated valid bit). If request control logic 102 detects that at least one of the used buffer pointer entries is valid (Step 502, YES branch), processing proceeds to READ_PACKET state 503.

Within READ_PACKET state 503, request control logic 102 retrieves a valid used buffer pointer value from used buffer pointer list 112. In the described embodiment, request control logic 102 retrieves each validated used buffer pointer value in a first in (i.e., first validated), first out (i.e., first retrieved) order. Request control logic 102 uses the retrieved used buffer pointer value as a read address to retrieve the sRIO request packet stored in the corresponding memory block of buffer memory 120. Request control logic 102 also appends the retrieved used buffer pointer value to the retrieved sRIO request packet, such that this used buffer pointer value forms the transaction ID value of the retrieved sRIO request packet. The retrieved sRIO request packet and the associated transaction ID value are routed through sRIO port 1 to an sRIO end-point.

Thus, in the present example, request control logic 102 initially retrieves the used buffer pointer value of '0000 0000' from the valid used buffer pointer entry $UBP_0$, and uses this valid used buffer pointer value to read the sRIO request packet previously written to the first memory block $MB_0$ of buffer memory 120. Request control logic 102 also appends the used buffer pointer value of '0000 0000' to the retrieved sRIO request packet, such that the retrieved sRIO request packet is effectively assigned a transaction ID value of '0000 0000'.

Request control logic 102 monitors the sRIO request packet being read from buffer memory 120 to determine when the end-of-packet (EOP) indicator associated with the sRIO request packet has been activated (EOP=1). Upon detecting the activated end-of-packet indicator, request control logic 101 completes the reading of the sRIO request packet, and processing proceeds to READ_DONE state 504.

Within READ_DONE state 504, request control logic 102 loads and then starts a response timeout timer in timeout timer block 103. More specifically, request control logic 102 loads and starts a response timeout timer that is associated with the transaction ID value assigned to the sRIO request packet transmitted to sRIO port 1 during READ_PACKET state 503. Thus, in the present example, request control logic 102 loads and starts a response timeout timer associated with the transaction ID value '0000 0000'. The response timeout timer is initially loaded with a request timeout count, which is selected to correspond with a time period during which a response to the transmitted request packet should be received.

In addition, request control logic 102 invalidates the used buffer pointer entry previously used to read the sRIO request packet from buffer memory 120 during READ_PACKET state 503. Thus, in the present example, request control logic 102 resets the valid bit of used buffer pointer entry $UBP_0$ to a logic '0' (invalid) state. While the used buffer pointer entry $UBP_0$ has an invalid state, request control logic 102 will not read the corresponding request packet from buffer memory 120 (although this request packet temporarily remains in buffer memory 120, in case this request packet needs to be re-sent). The manner in which a request packet may be re-sent is described in more detail below.

Also within READ_DONE state 504, request control logic 102 validates the request buffer pointer entry associated with the memory block from which the sRIO request packet was read during READ_PACKET state 503. Thus, in the present example, request control logic 102 sets the valid bit of request buffer pointer entry $RBP_0$ to a logic '1' (valid) state. As described below, this valid request buffer pointer entry $RBP_0$ indicates that a sRIO response packet having a transaction ID value equal to the corresponding request buffer pointer value (i.e., '0000 0000'), should be received on sRIO port 1. Note that setting the valid bit of a request buffer pointer entry may be viewed as 'adding' the associated request buffer pointer value (or the corresponding memory block) to request buffer pointer list 113. When the above-described steps of READ_DONE state 504 have been completed, processing returns to IDLE state 501.

Returning now to Step 502, it is possible that there are no valid used buffer pointer entries (Step 502, NO branch). In this case, request control logic 102 will determine whether any of the previously started request timeout timers have expired (i.e., counted down to a zero value). If not (Step 505, NO branch), processing returns to IDLE state 501. However, if a request timeout timer has expired (Step 505, YES branch), processing proceeds to RESEND_PACKET state 506. In RESEND_PACKET state 506, request control logic 102 re-sends a sRIO request packet that did not receive a response within the expected request period. More specifically, request control logic 102 identifies the request timeout timer that expired, and then validates the associated used buffer pointer entry. In the present example, if the request timeout timer associated with transaction ID value '0000 0000' has expired, this indicates that the sRIO request packet previously read from address '0000 0000' of buffer memory 120 did not result in receipt of a corresponding sRIO response packet within the timeout period. In this case, request control logic 102 sets the valid bit of the corresponding used buffer pointer entry $UBP_0$ to a logic '1' state. In one embodiment, this valid bit is only set to a logic '1' state if the valid bit of the corresponding request buffer pointer entry $RBP_0$ also has a logic '1' state. Processing then returns to IDLE state 501. The valid used buffer pointer entry $UBP_0$ is detected in Step 502, and processing proceeds through READ_PACKET state 503 and READ_DONE state 504 in the manner described above, thereby causing the associated sRIO request packet to be re-sent. In one embodiment, if the sRIO request packet is re-sent a predetermined number of times (e.g., 16 times), and the request timeout timer expires each of these times, then the sRIO request packet may stop being re-sent, and an error logged.

Figure 6:
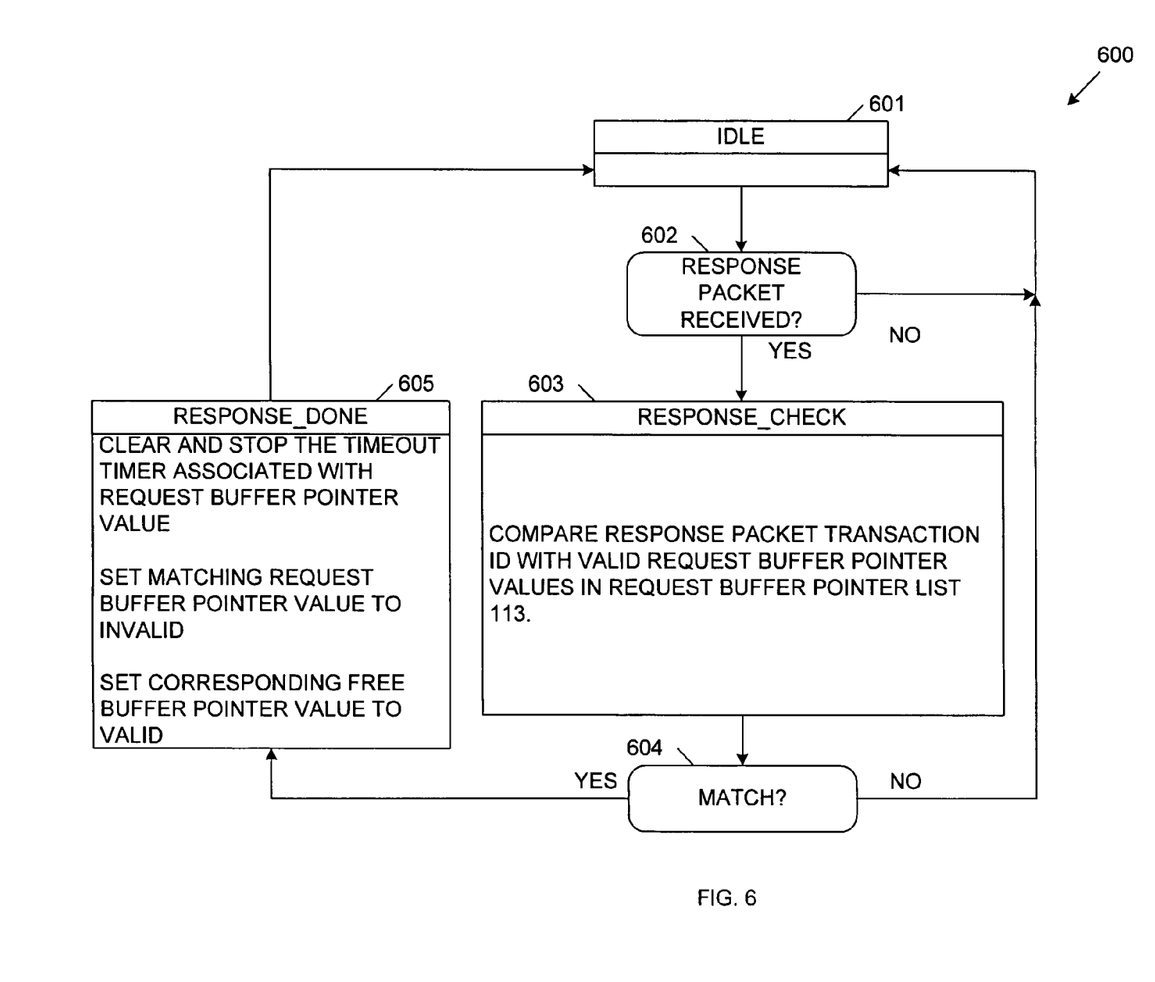
FIG. 6 is a flow diagram illustrating the operation of response handler logic present in the serial buffer of FIG. 1 in accordance with one embodiment of the present invention.

FIG. 6 is a flow diagram 600 illustrating the operation of response handler logic 104 in accordance with one embodiment of the present invention. Response handler logic 104 is initially in an IDLE state 601. Response handler logic 104 monitors sRIO port 1 to determine whether any sRIO response packets are received. If not (Step 602, NO branch), then processing returns to IDLE state 601. However, if response handler logic 104 detects a sRIO response packet is received from sRIO port 1, then processing proceeds to RESPONSE_CHECK state 603.

Within RESPONSE_CHECK state 603, response handler logic 104 extracts the transaction ID value from the received sRIO response packet, and compares this response transaction ID value with any valid request buffer pointer values stored in request buffer pointer list 113. If response handler logic 104 detects a match, this indicates that the received sRIO response packet represents a response to a previously transmitted sRIO request packet. Under these conditions (Step 604, YES branch), processing proceeds to RESPONSE_DONE state 605. In the present example, an sRIO response packet having a transaction ID value of '0000 0000' would result in match with the valid request buffer pointer value of request buffer pointer entry $RBP_0$. If response handler logic 104 does not detect a match (Step 604, NO branch), the received sRIO response packet does not represent a response to a previously transmitted sRIO request packet, and processing returns to IDLE state 601.

Within RESPONSE_DONE state 605, response handler logic 104 stops and clears the request timeout timer associated with the response transaction ID value. In the present example, response handler logic 104 stops and clears the request timeout timer associated with the transaction ID value '0000 0000'.

Response handler logic 104 also invalidates the request buffer pointer entry associated with the response packet transaction ID value. In the present example, response handler logic 104 resets the valid bit of request buffer pointer entry $RBP_0$ to a logic '0' state to invalidate this entry. Note that invalidating the request buffer pointer entry $RBP_0$ in this manner effectively 'removes' this request buffer pointer entry (and the corresponding memory block) from the request buffer pointer list 113.

Response handler logic 104 also validates the free buffer pointer value associated with the response packet transaction ID value. In the present example, response handler logic 104 sets the valid bit of free buffer pointer entry $FBP_0$ to a logic '1' state to re-validate this entry. Note that re-validating the free buffer pointer entry $FBP_0$ in this manner effectively 'adds' this free buffer pointer entry (and the corresponding memory block $MB_0$) to the free buffer pointer list 111, such that the associated memory buffer $MB_0$ can be re-used to store another sRIO request packet provided by queues Q0-Q3. Processing then proceeds from RESPONSE_DONE state 605 to IDLE state 601.

In the above-described manner, serial buffer 100 operates to allow sRIO response packets to be received in a different order than the corresponding sRIO request packets were transmitted, without experiencing head of line blocking conditions.

Although the present invention has been described in connection with various embodiments, it is understood that variations of these embodiments would be obvious to one of ordinary skill in the art. For example, although the described embodiments use valid indicator bits to effectively 'move' the memory blocks between free buffer pointer list 111, used buffer pointer list 112 and request buffer pointer list 113, it is understood that other means can be used to 'move' the memory blocks between these buffer pointer lists 111-113 in the manner required by the present invention. Thus, the present invention is limited only by the following claims.

We claim:

1. A serial buffer comprising:
a buffer memory having a plurality of memory blocks, wherein the number of memory blocks is represented by an integer, N, and wherein each of the N memory blocks has corresponding unique memory block address;
a free buffer pointer list that includes N free buffer pointer entries, each storing a free buffer address that corresponds with the memory block address of a corresponding one of the N memory blocks, and each storing a first valid indicator that indicates whether the corresponding one of the N memory blocks is available to store a request packet;
a used buffer pointer list that includes N used buffer pointer entries, each storing a used buffer address that corresponds with the memory block address of a corresponding one of the N memory blocks, and each storing a second valid indicator that indicates whether the corresponding one of the N memory blocks stores a request packet to be transmitted out of the serial buffer; and
a request buffer pointer list that includes N request buffer pointer entries, each storing a request buffer address that corresponds with the memory block address of a corresponding one of the N memory blocks, and each storing a third valid indicator that indicates whether a request packet has been transmitted out of the serial buffer from the corresponding one of the N memory blocks, and a corresponding response is expected.

2. The serial buffer of claim 1, further comprising one or more queues that load request packets into the memory blocks of the buffer memory, wherein each of the request packets is loaded into a corresponding one of the memory blocks of the buffer memory.

3. The serial buffer of claim 1, wherein the expected corresponding response comprises a response packet received by the serial buffer or an indication that a timeout period has expired.

4. The serial buffer of claim 1, wherein the free buffer addresses are identical to the memory block addresses.

5. The serial buffer of claim 4, wherein the used buffer addresses are identical to the memory block addresses.

6. The serial buffer of claim 5, wherein the request buffer addresses are identical to the memory block addresses.

7. The serial buffer of claim 1, further comprising write control logic coupled to the free buffer pointer list, wherein the write control logic determines whether at least one of the first valid indicators indicates that one of the memory blocks is available to store a request packet.

8. The serial buffer of claim 1, further comprising request control circuit that reads request packets only from memory blocks identified by the used buffer pointer list as storing request packets to be transmitted out of the serial buffer.

9. The serial buffer of claim 8, further comprising a request timeout timer associated with each of the memory blocks, wherein the request control circuit starts the request timeout timer associated with a memory block upon reading a request packet from the memory block.

10. The serial buffer of claim 9, further comprising a response handler that stops the timeout timer upon receiving a response packet associated with the request packet read from the memory block.

11. The serial buffer of claim 10, wherein the request control circuit re-reads the request packet from the memory block upon detecting that the associated request timeout timer has expired.

12. The serial buffer of claim 1, further comprising request control circuit coupled to the used buffer pointer list and the buffer memory, wherein the request control circuit determines that one of the second valid indicators indicates that the corresponding one of the N memory blocks stores a request packet to be transmitted out of the serial buffer, and in response, retrieves the corresponding used buffer address from the used buffer pointer list, retrieves the request packet from the corresponding one of the N memory blocks using the retrieved used buffer address, and appends the retrieved used buffer address to the request packet.

13. The serial buffer of claim 1, further comprising response handler logic that identifies response packets received by the serial buffer in response to request packets read from the memory buffer.

14. The serial buffer of claim 1, wherein each of the memory blocks has a capacity equal to a maximum request packet size.

15. A method of operating a serial buffer comprising:
defining a plurality of memory blocks in a buffer memory, wherein the number of memory blocks is represented by an integer, N, and wherein each of the N memory blocks has corresponding unique memory block address;
maintaining a first list of each of the memory blocks available to store a request packet, the first list having N free buffer pointer entries, each including a free buffer address that corresponds with the memory block address of a corresponding one of the N memory blocks, and a first valid indicator that indicates whether the corresponding one of the memory blocks is available to store a request packet;
maintaining a second list of each of the memory blocks that stores a request packet to be transferred out of the serial buffer, the second list having N used buffer pointer entries, each including a used buffer address that corresponds with the memory block address of a corresponding one of the N memory blocks, and a second valid indicator that indicates whether the corresponding one of the N memory blocks stores a request packet to be transferred out of the serial buffer; and
maintaining a third list of each of the memory blocks that stores a request packet that has been transferred out of the serial buffer, but has not yet received an expected corresponding response, the third list having N request buffer pointer entries, each including a request buffer address that corresponds with the memory block address of a corresponding one of the N memory blocks, and a third valid indicator that indicates whether a request packet has been transferred out of the serial buffer from the corresponding one of the memory blocks, and a corresponding response is expected.

16. The method of claim 15, further comprising writing request packets only to memory blocks in the first list.

17. The method of claim 15, further comprising reading request packets only from memory blocks in the second list.

18. The method of claim 15, further comprising transferring a memory block from the first list to the second list in response to writing a request packet to the memory block.

19. The method of claim 15, further comprising transferring a memory block from the second list to the third list in response to reading a request packet from the memory block.

20. The method of claim 15, further comprising transferring a memory block from the third list to the first list in response to receiving a response packet associated with a request packet read from the memory block.

* * * * *